United States Patent
Risley (10) Patent No.: US 7,358,432 B2
(45) Date of Patent: Apr. 15, 2008

(54) METHOD AND APPARATUS FOR TEACHING RHYTHM

(76) Inventor: Steven George Risley, 330 River Rd., Clio, CA (US) 96106

( * ) Notice: Subject to any disclaimer, the term of this patent is extended or adjusted under 35 U.S.C. 154(b) by 229 days.

(21) Appl. No.: 11/118,285

(22) Filed: Apr. 28, 2005

(65) Prior Publication Data

US 2005/0241459 A1 Nov. 3, 2005

Related U.S. Application Data

(60) Provisional application No. 60/566,048, filed on Apr. 28, 2004.

(51) Int. Cl.
 *G09B 15/00* (2006.01)
 *G09B 15/02* (2006.01)
 *G09B 15/04* (2006.01)
(52) U.S. Cl. ............... 84/470 R; 84/477 R; 84/485 R; 84/609; 84/611
(58) Field of Classification Search ............... None
 See application file for complete search history.

(56) References Cited

U.S. PATENT DOCUMENTS

| | | | | | |
|---|---|---|---|---|---|
| 3,247,307 | A | * | 4/1966 | Campbell, Jr. | ............... 84/713 |
| 3,406,604 | A | * | 10/1968 | Stickley et al. | ............... 84/484 |
| 5,783,764 | A | * | 7/1998 | Amar | ................ 84/479 A |
| 6,215,057 | B1 | * | 4/2001 | Oren-Chazon | ............ 84/470 R |
| 6,605,767 | B2 | * | 8/2003 | Fiks et al. | ............... 84/423 R |
| 2001/0032539 | A1 | * | 10/2001 | Chantzis et al. | .............. 84/478 |
| 2001/0039869 | A1 | * | 11/2001 | Oren-Chazon | ................... 84/1 |
| 2004/0069123 | A1 | * | 4/2004 | Becker et al. | ................ 84/612 |

* cited by examiner

*Primary Examiner*—Marlon T Fletcher
(74) *Attorney, Agent, or Firm*—Craig M. Stainbrook; Stainbrook & Stainbrook, LLP (57) ABSTRACT

An apparatus for teaching rhythm includes a housing having a plurality of tempo indicator lights and a plurality of beat indicator lights corresponding to the tempo indicator lights, such that the beat indicator lights can be selectively illuminated to indicate a desired beat in a rhythm. Circuitry illuminates the tempo indicator lights in sequence and the selected beat indicator lights in sequence, so that a user may attempt to manually generate a sequence of sounds synchronous with the selectively illuminated beat indicator lights.

8 Claims, 8 Drawing Sheets

RHYTHMOPOLY

FIG._6 RHYTHMATCH

FIG._7 RHYTHMOUNTAIN

FIG._8

FIG._10  RHYTHMOLOGY

FIG._9  RHYTHMWHEEL

METHOD AND APPARATUS FOR TEACHING RHYTHM

CROSS REFERENCE TO RELATED APPLICATIONS

The present application claims the benefit of the filing date of U.S. Provisional Patent Application Ser. No. 60/566,048, filed 28 Apr. 2004.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to teaching and training tools, and more particularly to an improved method and apparatus for teaching rhythm.

BACKGROUND INFORMATION AND DISCUSSION OF RELATED ART

Currently, teaching rhythm is a challenge. The teacher must now clap or mark beats with, for example, a stick striking a desk or the like. Similarly, the teacher may use various forms of nomenclature on paper or chalk board to represent beats and the overall rhythm. The teacher may also use vocal representations of beats, such as "Mississippi mud" or "tiki-tiki ta ta" in an attempt to show rhythmic patterns. The students may or may not understand the basis of what the teacher is trying to do, and thus may fail to learn the basics of rhythm.

It would be advantageous to have a three-dimensional apparatus that allows students and teachers alike to see an approach to rhythm and musical time, while still keeping the advantages of the auditory or other more conventional visual representations of rhythm now in use.

U.S. Pat. No. 6,469,238, issued Oct. 22, 2002 to applicant herein, discloses a method and apparatus for teaching rhythm. Rhythm, beat, choreography, and body movement are taught, and a coordination system for rehabilitation is provided, using an apparatus having a base, vertical time-indicators, and beat marks. Students or patients clap, or perform similar functions when the teacher notes that a beat marker has been passed. This method and apparatus are general for all time signatures.

The foregoing patent reflects the current state of the art of which the present inventor is aware. Reference to, and discussion of, this patent is intended to aid in discharging Applicant's acknowledged duty of candor in disclosing information that may be relevant to the examination of claims to the present invention. However, it is respectfully submitted that the above-indicated patent does not disclose, teach, suggest, show, or otherwise render obvious, either singly or when considered in combination with any other art, the invention described and claimed herein.

BRIEF SUMMARY OF THE INVENTION

The present invention provides an apparatus for teaching rhythm including a housing having a plurality of tempo indicator lights and a plurality of beat indicator lights corresponding to the tempo indicator lights, such that the beat indicator lights can be selectively illuminated to indicate a desired beat in a rhythm. Circuitry illuminates the tempo indicator lights in sequence and the selected beat indicator lights in sequence, so that a user may attempt to manually generate a sequence of sounds synchronous with the selectively illuminated beat indicator lights.

The present invention thus provides an electronic rhythm teaching apparatus that allows a person to practice keeping the beat to a predetermined rhythm. The user can select the beat sequence, select the beats that are to be accented, increase or decrease the tempo, select the degree of difficulty, generate a score by sensing how well a person stayed on the beat, choose to hear the beat, and choose the type of sound that is generated. A number of the inventive units can be interconnected so that a plurality of users can keep the beat together. Alternatively, a plurality of units can be connected together end-to-end to provide a longer rhythmical phrase.

It is therefore an object of the present invention to provide a new and improved rhythm teaching apparatus that allows a person to practice keeping the beat to a predetermined rhythm.

It is a further object of the present invention to provide a new and improved rhythm teaching apparatus where the user can select the beat sequence.

It is a still further object of the present invention to provide a new and improved rhythm teaching apparatus where the user can select the beats that are to be accented.

It is a still further object of the present invention to provide a new and improved rhythm teaching apparatus where the user can increase or decrease the tempo.

It is a still further object of the present invention to provide a new and improved rhythm teaching apparatus where the user can select the degree of difficulty.

It is a still further object of the present invention to provide a new and improved rhythm teaching apparatus where a score can be generated by sensing how well a person stayed on the beat.

It is a still further object of the present invention to provide a new and improved rhythm teaching apparatus where a user can choose to hear the beat.

It is a still further object of the present invention to provide a new and improved rhythm teaching apparatus where a user can choose the type of sound that is generated.

It is a still further object of the present invention to provide a new and improved rhythm teaching apparatus where a number of units can interconnected so that a plurality of users can keep the beat together.

It is a still further object of the present invention to provide a new and improved rhythm teaching apparatus where a plurality of units can be connected together end-to-end to provide a longer rhythmical phrase.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIGS. 5A-10 are a series of views of alternate versions of a game apparatus based on one or multi-sided embodiments of the inventive rhythm teaching apparatus.

DETAILED DESCRIPTION OF THE INVENTION

Figure 1:
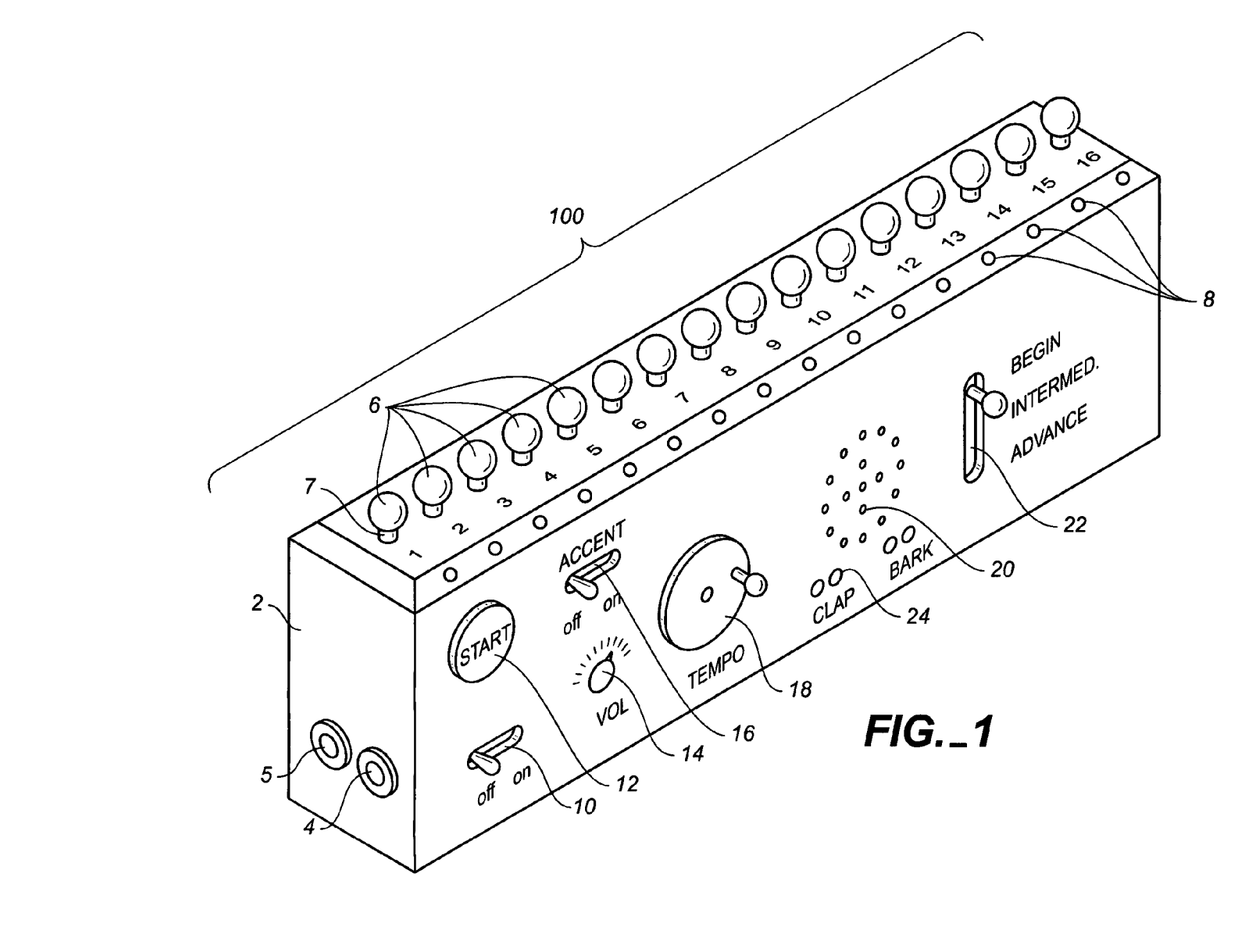
FIG. 1 is a perspective view of a rhythm teaching apparatus of this invention.
Figure 2:
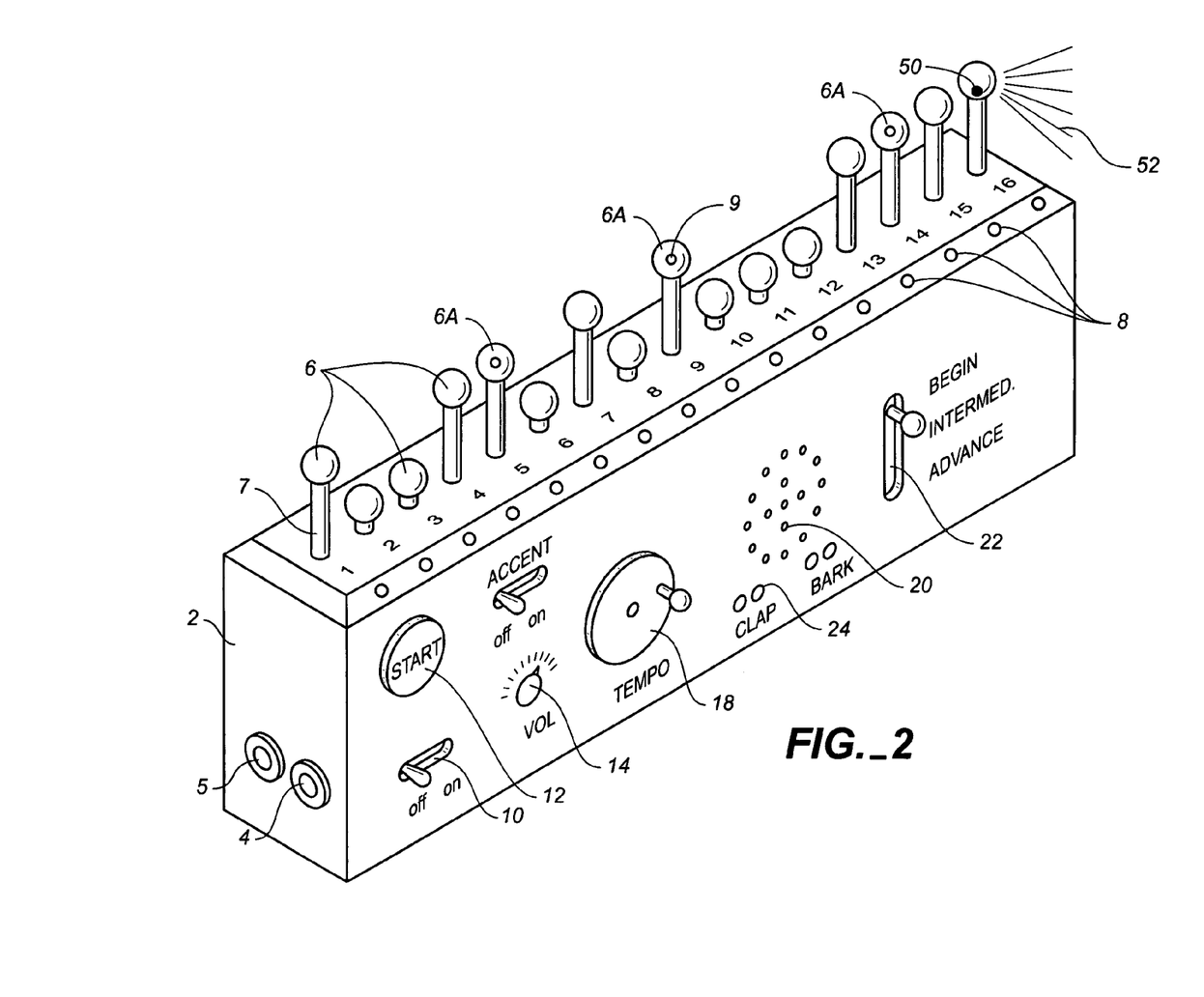
FIG. 2 is a perspective view of the rhythm teaching apparatus of FIG. 1 in operation.

Referring to FIGS. 1 through 4, wherein like reference numerals refer to like components in the various views, there is illustrated therein a new and improved apparatus 100 for teaching rhythm. FIG. 1 is a perspective view of the apparatus, while FIG. 2 illustrates the apparatus in operation.

The apparatus is contained in a housing 2 including an on-off switch 10. To create a beat sequence, the user lifts one or a plurality of a series of balls 6 on posts 7. The apparatus of the preferred embodiment includes sixteen such posts. Each lifted post 7 indicates the point at which the user claps, or makes a noise such as clicking two sticks together. The user then selects the tempo, or speed at which the beats occur by turning knob 18, and controls volume by turning knob 14. The user can also select a "level of difficulty" by sliding knob 22 up or down (e.g., advanced difficulty is being right on the beat, while beginner difficulty allows room to be close to the beat but not right on). The user can then press the start button 12. A row of LED lights 8 shows the tempo of the beats for one bar (e.g., one through sixteen), and each post 7 and ball 6 that has been lifted includes an LED 50 that lights up 52 in sequence. The posts 7 and balls 6 that have not been lifted do not light up, although the tempo beat keeping LED's 8 do light up to show where the user is in the sequence. If the user misses, a brief "raspberry" sound is generated.

The game continues for eight bars, then the LED's 8 light up to display the final score. In a perfect score, all the LED's light up. The user can select which beats are accented (the user is to clap louder on these beats) by engaging accent switch 16 and turning one or more of the balls (e.g., 6A) so that a red dot 9 is facing the user. An optional feature causes the beat to automatically speed up a bit after every two bars. The user can decide to hear the beats by pressing one of the sound buttons 24. Each sound button creates a different sound, for example, "bark", "clap", or "bell" that emanates from speaker 20. This is a way to practice by hearing the beat sequence before you try it yourself. A headphone jack 4 allows the user to practice hearing the beat without disturbing others. The user can also actually play the game while listening to the beat in the headphones. A number of users can play the game together by plugging a cable into jack 5 and connecting to a mating jack on one or more companion units.

Figure 3:
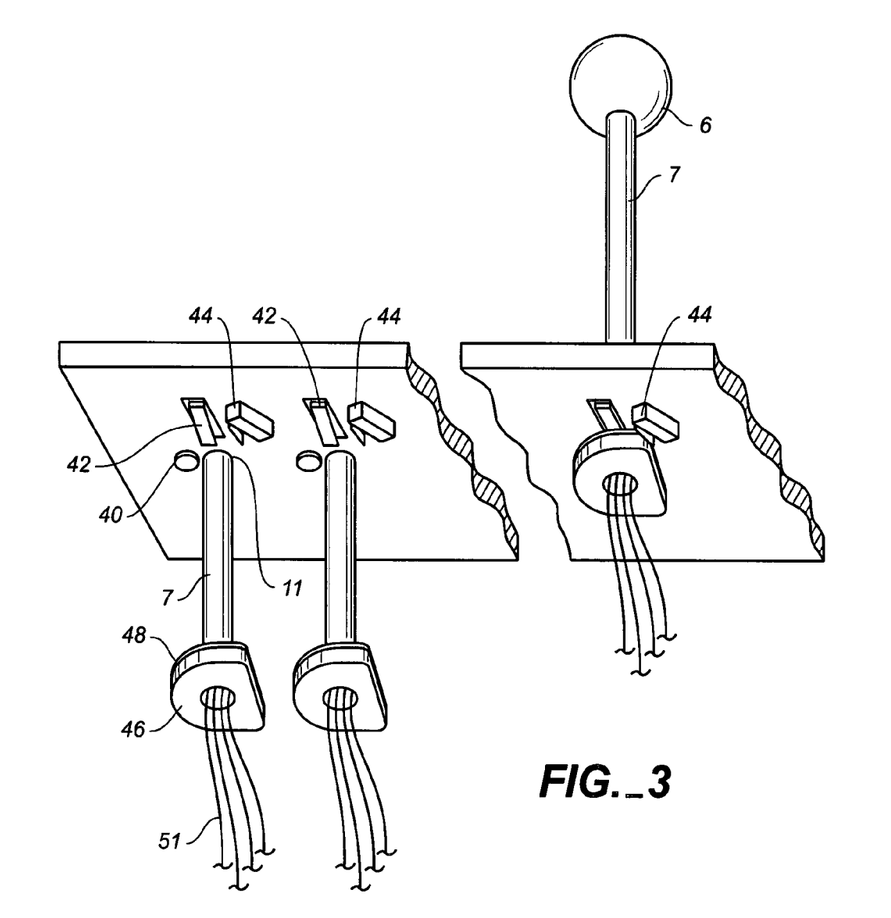
FIG. 3 is a cutaway view of the inside of the rhythm teaching apparatus of FIGS. 1 and 2.

FIG. 3 shows a partial view of the inside of the unit looking up to where the posts 7 exit through apertures 11. At the bottom of each post is a washer 46 that includes a ferrous metal portion 48. When the post is lifted, the ferrous portion 48 makes contact with magnet 40 and thereby holds the post up. Alternatively, the post can be held up by other standard means such as a mechanical latching device. When the post 7 is in the lifted position, the washer 46 makes contact with beat micro switch 42 which allows the LED 50 located in ball 6 of that particular post to be activated by the microprocessor via wires 51. To create an accent or emphasis beat the user turns the ball 6 one hundred and eighty degrees thereby activating emphasis micro switch 44. This tells the microprocessor that at these spots, the sound volume is increased.

Figure 4:
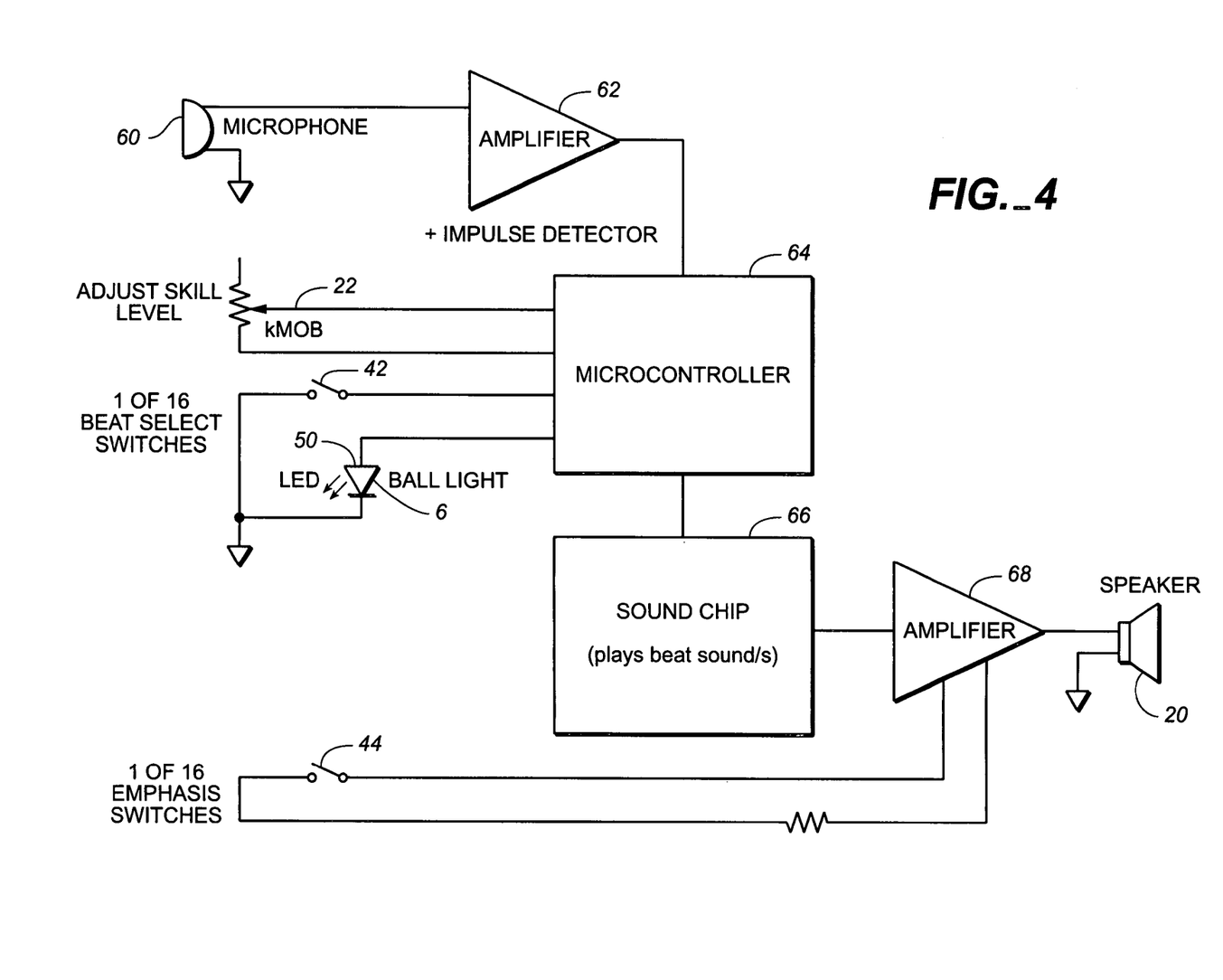
FIG. 4 is a schematic block diagram of the circuitry of the inventive rhythm teaching apparatus.

FIG. 4 is a schematic block diagram of the circuitry of the inventive apparatus, including microphone 60 to monitor and detect the user's hand clap or other generated sound, interconnected with microphone amplifier 62, microcontroller 64, sound chip 66 to play the beat sounds, speaker amplifier 68, and speaker 20. Skill level adjustment is accomplished at knob 22. Beat select switches 42 selectively activate ball 6 LED 50. Emphasis switches 44 accent selected beats.

FIGS. 5A-10 are a series of views of alternate versions of a game apparatus based on one or multi-sided embodiments of the inventive apparatus.

When using the rhythm teaching apparatus disclosed in U.S. Pat. No. 6,469,238 in the classroom, a teacher may break the class up into smaller groups and assign each group with their own sound (e.g., drums for one group, wood blocks for another, tambourines for the third, etc.). Each group would then have a rhythm teaching apparatus displayed in front of them showing a rhythm unique to their sound group. Upon counting the numbered sequence, 1+2+3+4+, all the groups are synchronized but playing different rhythms which create rhythmic interplay. The number of groups and sounds are endless, but the preferred scenario is usually three or four different groups.

That former (manual) rhythm teaching apparatus is quite effective conveying rhythm to individuals, but a challenge for the teacher is to keep the class synchronized on the sequence beat (meaning the place within the measure that is marked by counting 1 de+da 2 de+da 3 de+da 4 de+da . . . ), while they all play their different rhythms. The present invention addresses this by providing an electronic rhythm teaching apparatus with lights that correspond to the sequence beat. This allows the user to see where the current "beat" is within that "measure" (4 beats in this case), and not be reliant on a "conductor" to constantly iterate the sequence beat.

A variety of games may be based on the inventive apparatus. For example, one game allows the next level of progression by allowing a number of players to interact rhythmically, just as the class would when using the manual rhythm teaching apparatus. This can be quite versatile, accommodating one to four or more players. The computer program in this game could even play the parts of absent players. Different sounds could be chosen and tapped out of their respective rhythms on a pressure sensitive pad. The machine could be used in "quiet mode" where the player tapping on the pad is monitored and scored, but not actually heard, or "audible mode" where each player would hear their own sound, such as drum, block, tambourine, claps, barks, chirps, etc. The pad could be broken into different sections either by color or picture to correspond to the manual version's beat markers. This would allow multiple sounds to be played by each individual. The different sounds could be visually represented such as by a pair of hands for clapping, a dog's face for barking, etc. The pad could also be simply black and red that would correspond to the colors used for regular beats (black) and accent beats (red).

Different game scenarios could be developed as follows:

Scenario #1, One to Four Players (see FIGS. 5A-7).

Figure 5A:
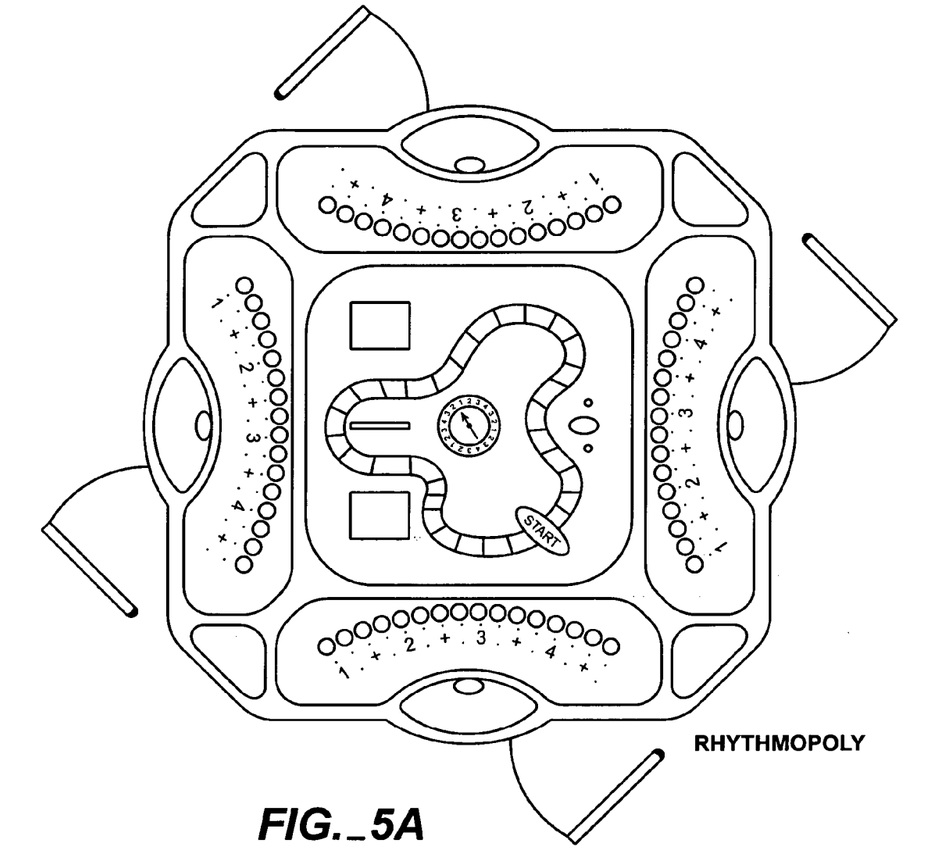
Figure 5B:
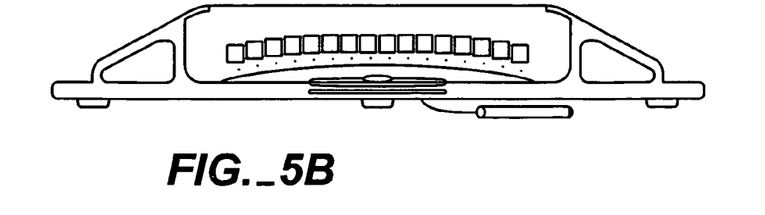
Figure 6:
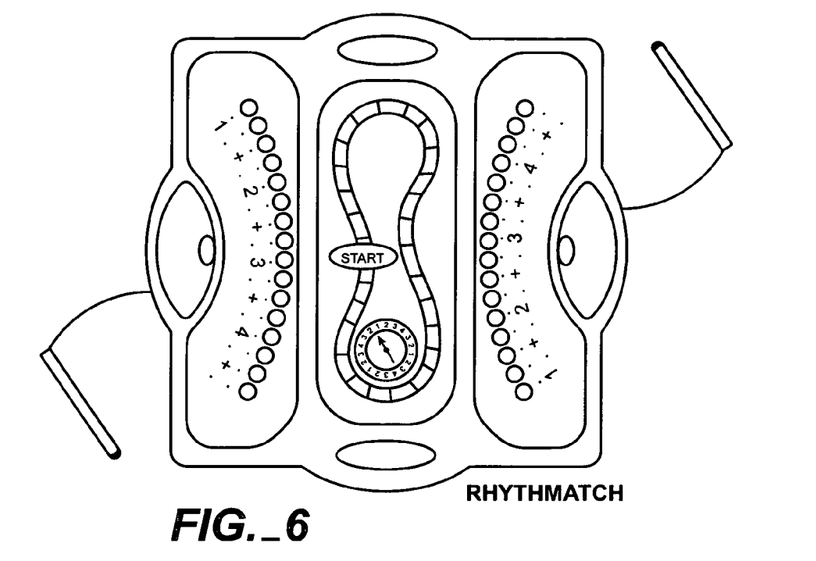
Figure 7:
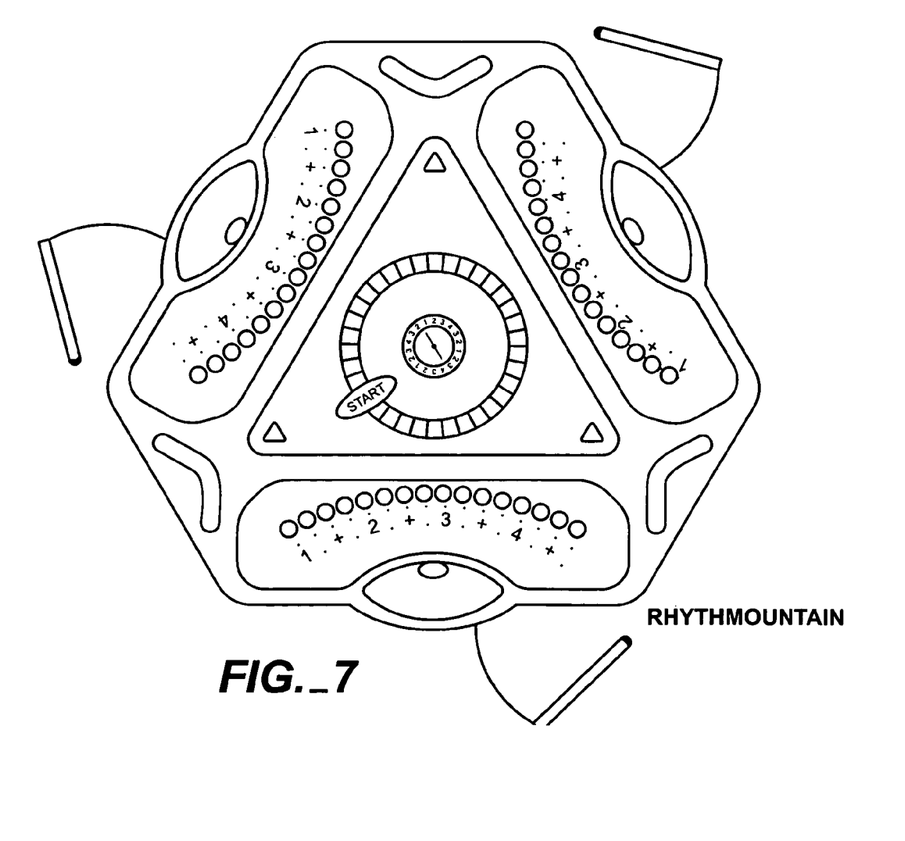

Players sit around a game board (FIGS. 5 and 5A illustrate "Rhythmopoly" for up to four players, FIG. 6 illustrates "Rhythmatch" for up to two players, and FIG. 7 illustrates "Rhythmountain" for up to three players). Each side has an electronic rhythm teaching apparatus connected to a pressure sensitive pad that is to be struck with a connected stick. The top consists of a circuitous track that returns to the same place one starts. The track is divided into alternating colored sections such as red, blue, yellow, green, purple, that would each represent a different area of the world. Tokens mark the players progress (this could be either group or individual.) A spinning arrow is mounted in the middle that points to numbered sections of the circle it is mounted within. The numbers around the circle are in the order 1, 2, 3, 4, 3, 2, 1 . . .

A player spins the arrow to find out how many spaces to move the token around the colored track. There is a stack of electronically coated cards the same colors as the track. The edges of the cards are colored to correspond to the regions/continents of the world and the indigenous rhythms therein. When a token is moved to a new position, a card is drawn and the colored edge of the card that matches the color of the tokens position is placed into the slot which reads the coded information.

Each players rhythm is then displayed by lights that correspond to the rhythm tree sitting in front of each player. The player then activates their rhythm tree by setting the rhythm posts matching the lighted rhythm. Accent beats are set once everybody has set their posts to the proper settings. Once the start button is pushed, the sequence countdown lights begin. Each player strikes the pad with their stick in sync with the displayed rhythm trying to accurately match the regular and accent beats. To strike an accent beat, the player simply taps the section of the pad colored red as the accents are colored. The computer within the game could play the parts of missing players if the requisite number are not present.

The rhythm repeats 16 times then pauses. The computer scores each player by accuracy giving the player 1 point per accurate 4 beat measure. The best possible score is 16 per rhythm round. The beat is then passed on around the board, each player re-setting their rhythm trees respectively. Start is pushed and the countdown begins again. This round is then scored. Round three and round four follow and then the final score is posted. The highest scoring player gets a flag representing the country from which the rhythm was played. The winner of the round spins for the next round. They move their token as many spaces as the spinner points to. Another card is drawn and the play begins again. The game ends when someone has made it back to the beginning (one lap around the track) or when someone has collected a flag from every country, whichever comes first.

Figure 8:
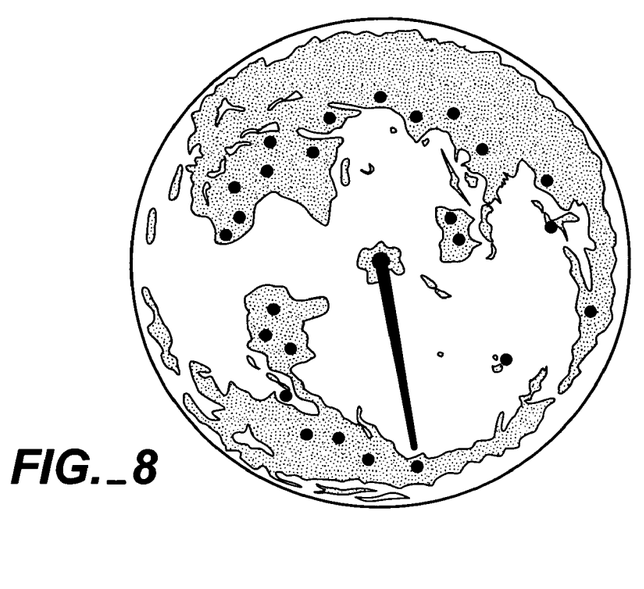

Scenario #2, One to Four Players (see FIG. 8).

A polar projection of the earth showing all continents. A pointing arrow (like the minute hand of a clock) which clicks into position as it is pointed to a certain location in the world. Once set the computer displays a rhythm from that region of the world by lighting up the sequence light that corresponds to that beat. Each player then sets his/her beat by a toggle switch that has three positions: Off, On and Accent (a louder beat). To direct the players through the "world of rhythms" many different possibilities present themselves, but one of the preferred would be as follows: Cards could be drawn from a pile, one at a time. Each card gives a name and slight description of the rhythm attempted. Trivia and historical information could be included in the description. The place in the world that each card represents could be indicated by color, number or even pictures. Once a card is drawn, the pointer arrow is set to the matching position on the map and the game proceeds from there. Players try to master each rhythm. The most accurate player receives a token or flag as a reward and as an indicator of which rhythms have been mastered by which player. The first player to collect all five country flags or tokens wins.

Scenario #3, One to Four Players (see FIG. 8, but the pointer could be removed).

A map of the world is located in the middle of the game with buttons at certain regions throughout. To begin, a player pushes a button which activates a rhythm from that area in the world. The board plays the rhythm a couple times out loud for the group to hear, then counts down 4, 3, 2, 1 and begins the sequence. The game could be scored in ways similar to the previous examples. Players receive some sort of award for being the most accurate player of a given rhythm. In case of a tie, player would play the rhythm again and it would slowly increase in speed until one player loses the beat. The machine would award the winner with a light show and the score could be kept electronically rather than collecting of a physical token or flag. Pictures of all the flags could be illuminated one by one as players win each rhythm round. First player with five flags wins. This scenario may be the preferred embodiment of the game as it has no separate pieces that could be lost or damaged.

Figure 9:
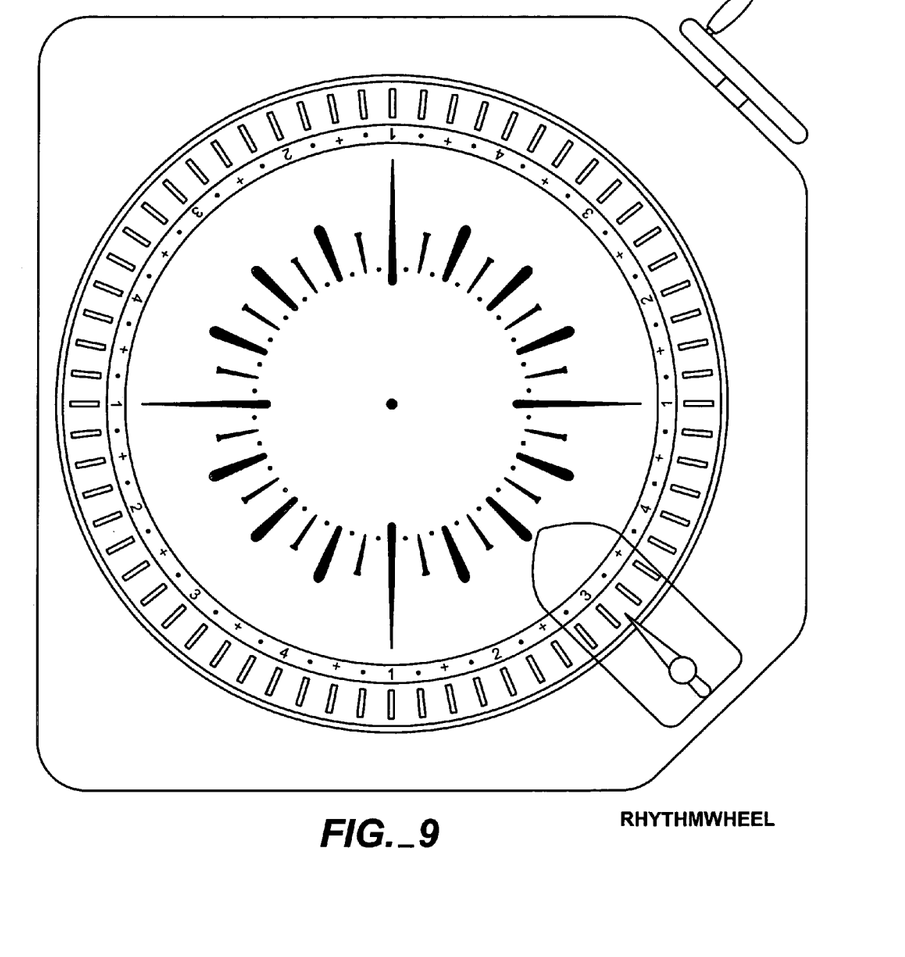
Figure 10:
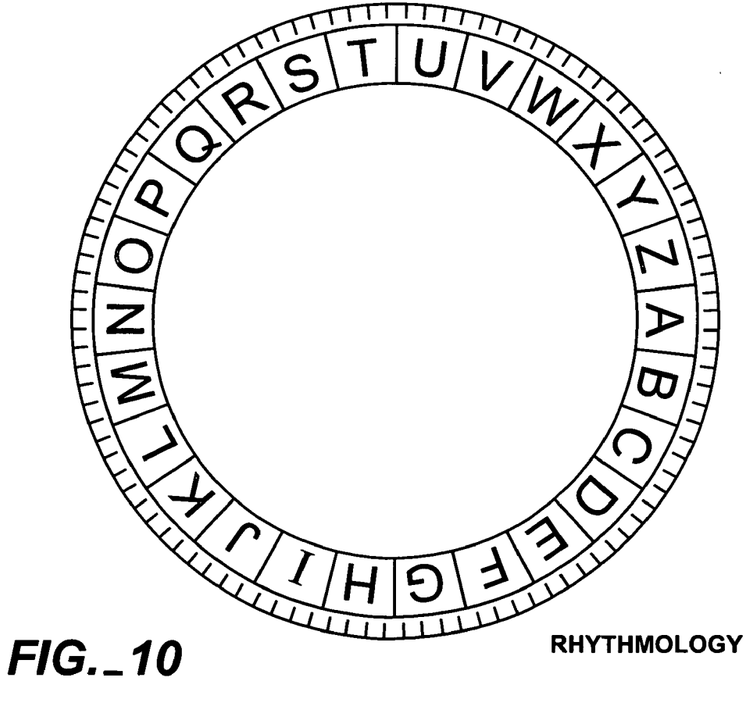

FIGS. 9-10 are views of alternate embodiments of the apparatus. Longer phrases of rhythm can be achieved by placing them around a circle, hence the "RhythmWheel" (see FIG. 9). Words can be represented by a rhythm in "Rhythmology" (see FIG. 10). Longer phrases can also be provided by and a plurality of units can be connected together end-to-end.

Accordingly, the invention may be characterized as an apparatus for teaching rhythm comprising a housing, a plurality of tempo indicator lights on the housing, a plurality of beat indicator lights corresponding to the tempo indicator lights on the housing, the beat indicator lights adapted to be selectively illuminated to indicate a desired beat in a rhythm, and circuitry for illuminating the tempo indicator lights in sequence and the selected beat indicator lights in sequence, wherein a user may attempt to manually generate a sequence of sounds synchronous with the selectively illuminated beat indicator lights.

The apparatus may further include circuitry enabling the user to select the beat sequence, select the beats that are to be accented, increase or decrease the tempo, select the degree of difficulty, generate a score by sensing how well a person stayed on the beat, choose to hear the beat, and choose the type of sound that is generated.

Alternatively, the invention may be characterized as a method for teaching rhythm comprising the steps of providing a plurality of tempo indicator lights and a plurality of beat indicator lights corresponding to the tempo indicator lights on a housing, illuminating the tempo indicator lights in sequence and selected beat indicator lights in sequence to represent a rhythm to be taught, and manually generating a sequence of sounds synchronous with the selectively illuminated beat indicator lights.

The inventive method may further include the steps of providing audio for demonstrating the selected beat in the rhythm to be taught, accenting the audio of one or more selected beats in the rhythm to be taught, selecting the type of audio output, selectively adjusting the tempo, selecting the degree of difficulty for manually generating sounds synchronous with the selectively illuminated beat indicator lights, and generating a score by sensing how well a user stayed on the beat.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A game apparatus for teaching rhythm comprising:
   a game board housing having a central portion with a track for moving game playing pieces, means for randomly generating a number for a player's move on said game board, a card reading slot, and at least two game playing sides, one each for a game player, each of said game playing sides including a pressure sensitive pad for percussively entering a rhythm;
   a stack of playing cards having a computer readable magnetic medium disposed on at least one side of each of said cards and at least one rhythm stored electronically thereon, said playing cards insertable into said card reading slot;
   at least one drum stick for use by each player to strike one of said pressure pads;
   a plurality of beat indicator lights on each of said game playing side of said housing, said beat indicator lights adapted to be selectively illuminated to indicate a desired beat in a rhythm; and
   circuitry and programmable control means for receiving input data from said playing cards when inserted into said card reading slot, and for illuminating said beat indicator lights in sequence according to the beat stored on the inserted card, wherein a player may attempt to manually generate a sequence of sounds synchronous with the selectively illuminated beat indicator lights by using said drum stick to strike said pressure sensitive pad.

2. The apparatus for teaching rhythm of claim 1 further including audio means for demonstrating the selected beat in a rhythm.

3. The apparatus for teaching rhythm of claim 2 including emphasis means for accenting the audio of one or more selected beats.

4. The apparatus for teaching rhythm of claim 2 including means for enabling and disabling said audio means.

5. The apparatus for teaching rhythm of claim 2 including means for selecting the type of audio output.

6. The apparatus for teaching rhythm of claim 1 including means to increase or decrease the tempo.

7. The apparatus for teaching rhythm of claim 1 including means to select the degree of difficulty for manually generating sounds synchronous with the selectively illuminated beat indicator lights.

8. The apparatus for teaching rhythm of claim 1 including means to generate a score by sensing how well a user stayed on the beat.

* * * * *